(12) United States Patent
Christakis

(10) Patent No.: US 12,114,670 B2
(45) Date of Patent: Oct. 15, 2024

(54) TOOL ATTACHMENT SYSTEM FOR GAMBRELS

(71) Applicant: Konstantinos Christakis, Dallas, GA (US)

(72) Inventor: Konstantinos Christakis, Dallas, GA (US)

(*) Notice: Subject to any disclaimer, the term of this patent is extended or adjusted under 35 U.S.C. 154(b) by 0 days.

(21) Appl. No.: 18/144,221

(22) Filed: May 7, 2023

(65) Prior Publication Data

US 2023/0380431 A1 Nov. 30, 2023

Related U.S. Application Data

(62) Division of application No. 17/368,519, filed on Jul. 6, 2021, now Pat. No. 11,647,757.

(60) Provisional application No. 63/049,051, filed on Jul. 7, 2020.

(51) Int. Cl.
- *A22B 5/00* (2006.01)
- *A22B 5/06* (2006.01)
- *B25H 3/00* (2006.01)

(52) U.S. Cl.
CPC .............. *A22B 5/06* (2013.01); *B25H 3/00* (2013.01)

(58) Field of Classification Search
CPC ........... A22B 5/06; A22B 5/08; A22B 5/0017; A22B 5/16; A22B 7/02; B25H 3/00
USPC ........................................................ 452/189
See application file for complete search history.

(56) References Cited

U.S. PATENT DOCUMENTS

| | | | | |
|---|---|---|---|---|
| 5,569,071 A * | 10/1996 | Metier | .............. | A22B 3/06 452/185 |
| 6,499,608 B1 * | 12/2002 | Sterling | .............. | A47B 96/027 211/70.1 |
| 7,971,736 B1 * | 7/2011 | Stewart | .............. | A47G 21/14 248/37.3 |
| 8,840,161 B1 * | 9/2014 | Gardner | .............. | A22B 5/00 294/151 |
| 9,247,754 B1 * | 2/2016 | Rudd | .............. | A22B 5/06 |

* cited by examiner

*Primary Examiner* — Richard T Price, Jr.
(74) *Attorney, Agent, or Firm* — Technology Law, PLLC

(57) ABSTRACT

An apparatus includes a gambrel that defines two hooks configured to support an animal carcass. A fastening system is operatively connected to the gambrel and is configured to releasably connect a bladed tool to the gambrel. In one embodiment, the fastening system includes at least one magnet that retains one or more tools with magnetic force. The apparatus provides a convenient, safe, and clean place to store tools while processing an animal carcass.

4 Claims, 3 Drawing Sheets

TOOL ATTACHMENT SYSTEM FOR GAMBRELS

CROSS-REFERENCE TO RELATED APPLICATION

This application is a divisional application of U.S. patent application Ser. No. 17/368,519, filed Jul. 6, 2021, which claims the benefit of U.S. Provisional Patent Application No. 63/049,051, filed Jul. 7, 2020, both of which are hereby incorporated by reference in their entireties.

TECHNICAL FIELD

This disclosure relates to gambrels for supporting slaughtered animals.

BACKGROUND

Processing animal carcasses to procure meat involves various tools, such as saws for cutting through bone and various knives for removing skin and separating the meat from other tissues.

SUMMARY

According to a first aspect of the invention, an apparatus for use when processing animals includes a gambrel that defines two hooks configured to support an animal carcass. The apparatus further includes a fastening system integrated into the gambrel and configured to releasably connect a bladed tool to the gambrel.

The apparatus provided herein improves upon the prior art by facilitating the process of skinning, gutting, and butchering animal carcasses by keeping the tools necessary to perform these tasks within easy reach of the person performing them. The apparatus provided herein also enables improved safety and sanitation by keeping the sharp tools in a secure place away from potential sources of contamination.

In one embodiment, the fastening system includes a magnet, which will automatically retain any bladed tool, such as various knives and saws having a ferrous blade, by simply placing the tool in close proximity to the magnet. The tools are easily released by a user by simply overcoming the magnetic force between the tool and the magnet. The fastening system may also retain tools without a blade, so long as a portion of the tool is comprised of a ferrous material.

According to a second aspect of the invention, an apparatus for use with a gambrel includes a piece of flexible material having a first edge, a second edge, and a slot midway between the first edge and the second edge. A first magnet is connected to the material at or adjacent to the first edge. A second magnet is connected to the material at or adjacent to the second edge. The apparatus enables a user to add magnetic tool holders to a pre-existing gambrel by inserting a portion of the gambrel, such as the hoist-engagement loop, through the slot.

A corresponding method of use is also provided.

The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

Figure 1:
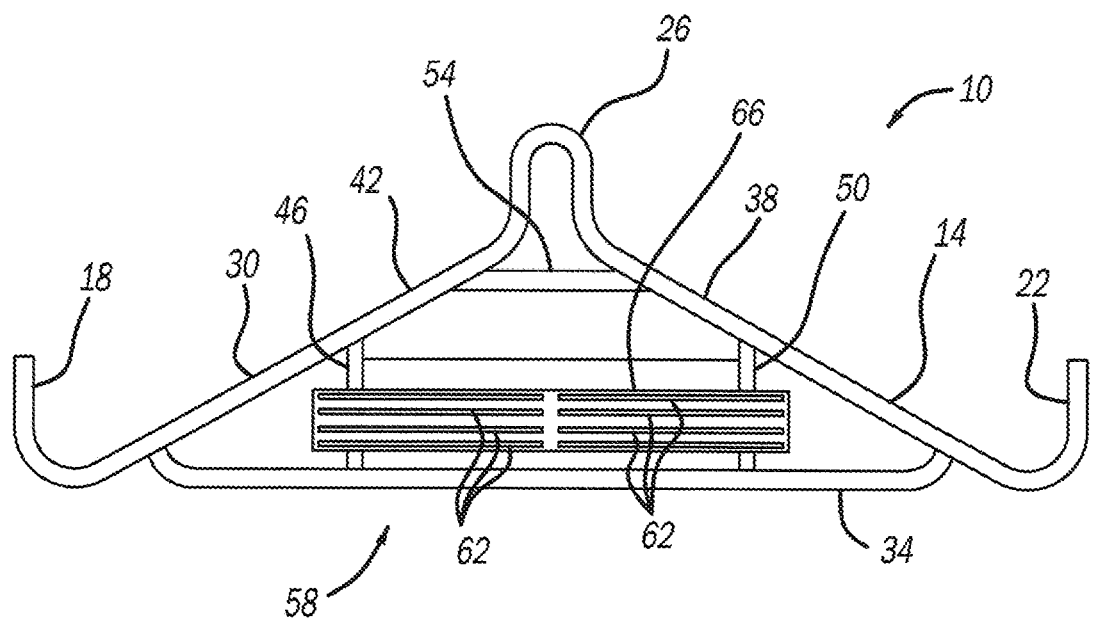
FIG. 1 is schematic, front view of a gambrel assembly including a gambrel and an integrated fastening system.
Figure 2:
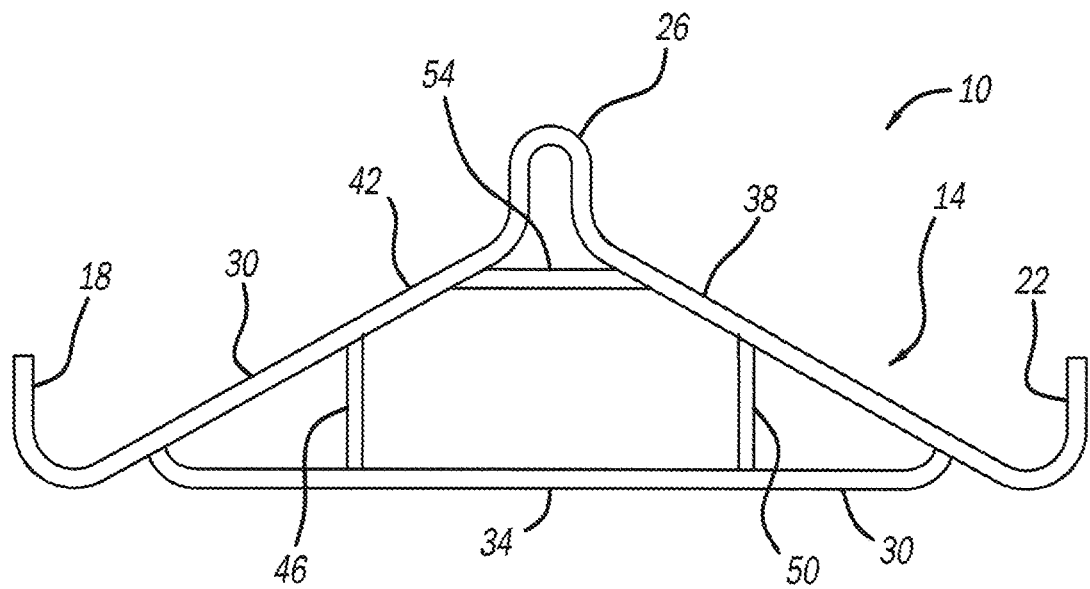
FIG. 2 is a schematic, front view of the gambrel of FIG. 1 prior to installation of the integrated fastening system.
Figure 3:
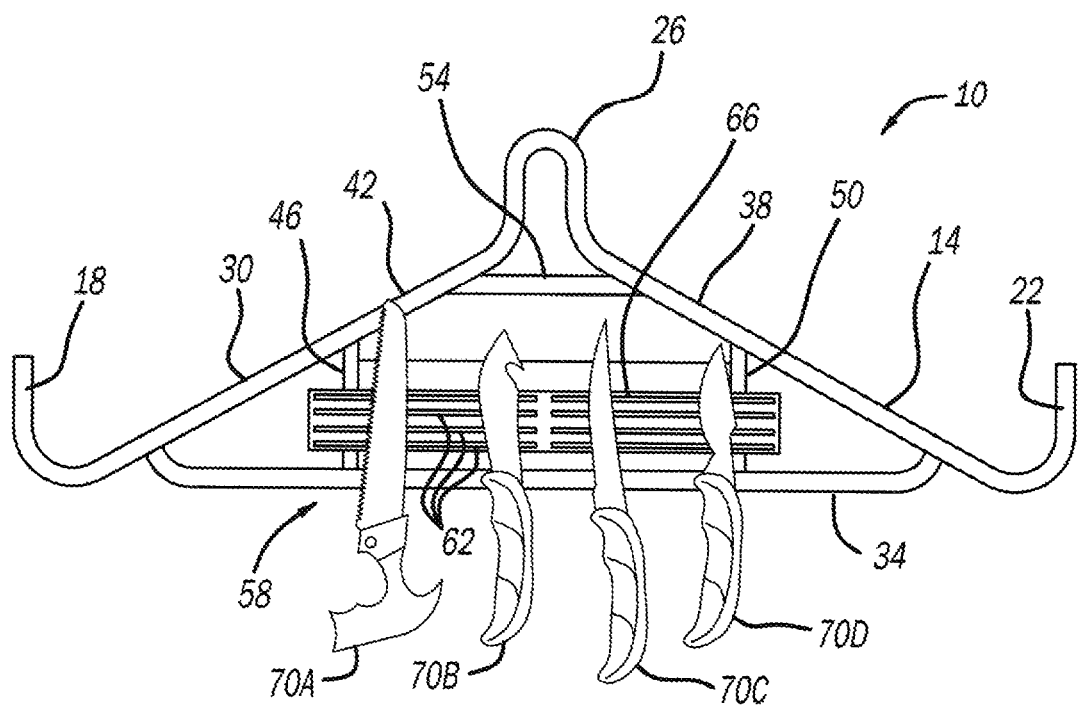
FIG. 3 is a schematic, front view of the gambrel assembly of FIG. 1 with bladed tools engaged with the fastening system.

Referring to FIGS. 1-3, wherein like reference numbers refer to like components throughout, a gambrel assembly 10 in accordance with the claimed invention is schematically depicted. The gambrel assembly 10 includes a gambrel 14. As understood by those skilled in the art, a "gambrel" is a device for suspending slaughtered animals. The gambrel 14 in the embodiment depicted includes two hooks 18, 22 and a hoist engagement element, i.e., loop 26. The two hooks 18, 22 and loop 26 are rigidly interconnected by structure 30.

The loop 26 is used with a hoist, hook, etc., to suspend the gambrel at a desired height above the ground. The hooks 18, 22 are used to engage with an animal carcass and thereby suspend the animal carcass at a height and position that facilitates skinning, gutting, or otherwise processing the carcass. Although the hoist engagement element is in the form of a loop 26, it should be noted that the hoist engagement element may have other configurations that are engageable with a hoist within the scope of the claimed invention.

The structure 30 that rigidly interconnects the hooks 18, 22 and loop 26 is configured such that, when the loop 26 is engaged with a hoist, hook 18 and hook 22 are balanced at substantially the same height and below the loop 26. In the embodiment depicted, the structure 30 is generally triangular, with a transverse segment 34 that is substantially horizontal in use, and angled segments 38, 42 extending from respective ends of the transverse segment 34 to the loop 26. Hooks 18, 22 are positioned at respective ends of the transverse segment 34. Other reinforcing segments 46, 50, 54 may also be employed as shown. It should be noted that the particular structure 30 shown is merely exemplary, and other structure configurations to interconnect the hooks 18, 22 and loop 26 may be employed within the scope of the claimed invention.

The gambrel assembly 10 also includes a fastening system 58 integrated with the gambrel 14 and configured to releasably connect or retain tools, especially bladed cutting tools, to the gambrel 14. In the embodiment depicted, the fastening system 58 includes a plurality of magnets 62. Magnets 62 may be permanently mounted with respect to the structure 30 within the scope of the claimed invention. However, in the embodiment depicted, the gambrel assembly 10 includes a steel plate 66 welded to the structure 30, and, more specifically, to the transverse segment 34 and reinforcing segments 46, 50, which are perpendicular to the transverse segment 34. The magnets 62 adhere to the plate 66 by magnetic force.

In the embodiment depicted, the magnets 62 include four parallel, elongated block magnets of sufficient length that four bladed tools (70A, 70D, 70C, 70D) are connectable to the gambrel 14 via the magnets 62, as shown in FIG. 3. It should be noted that other systems for releasably connecting tools to a gambrel may be employed within the scope of the claimed invention, including, but not limited to, members defining slots into which a tool can be releasably inserted, various hook and loop systems, etc.

Figure 4:
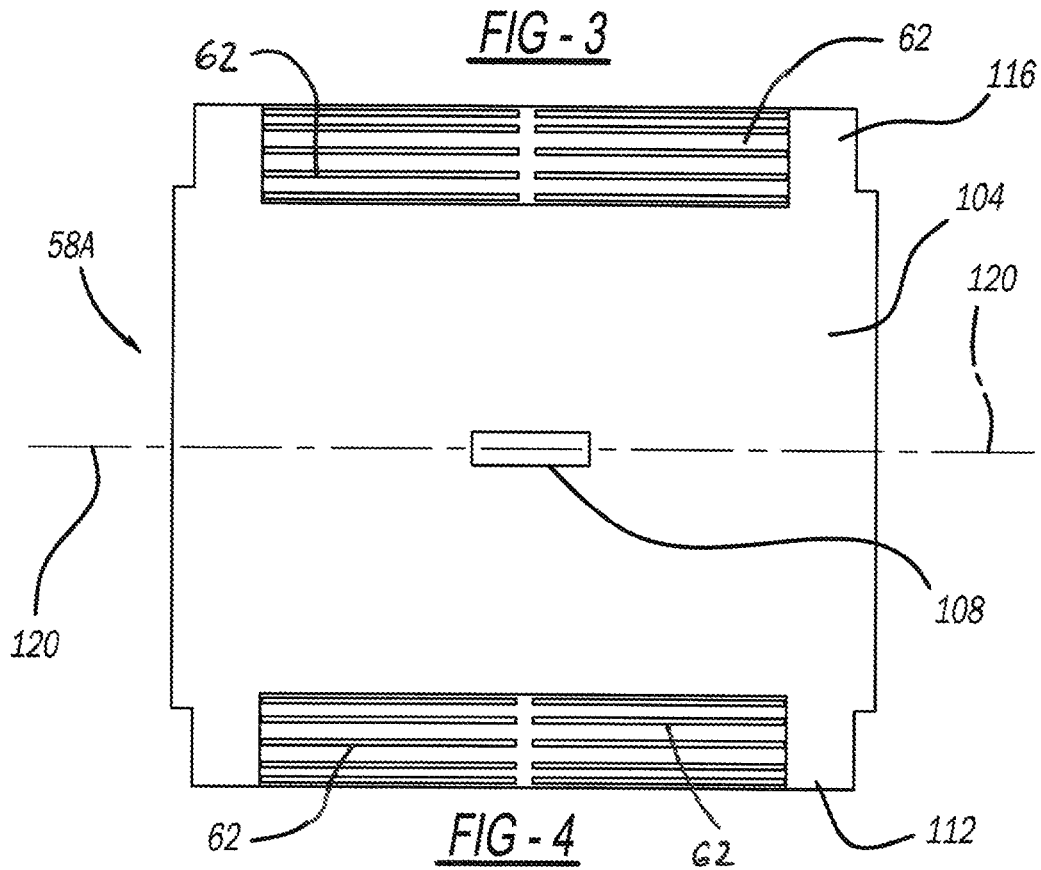
FIG. 4 is a schematic, top view of an alternative fastening system for use with a gambrel.

Referring to FIG. 4, wherein like reference numbers refer to like components from FIGS. 1-3, an alternative fastening system 58A that is usable with a gambrel 14 is schematically depicted. The fastening system 58A includes a piece of flexible material 104, such as vinyl fabric. In the embodiment depicted, the piece of flexible material 104 is square or rectangular. The piece of material 104 defines a slot 108 at or near its center. Magnets 62 are attached at or adjacent to one edge 112 of the piece of flexible material 104. Magnets 62 are also attached at or adjacent to edge 116, which is opposite edge 112. Those skilled in the art will recognize a variety of methods for attaching the magnets 62 to the material 104, including, but not limited to, sewing, forming pockets, adhesive bonding, etc.

Figure 5:
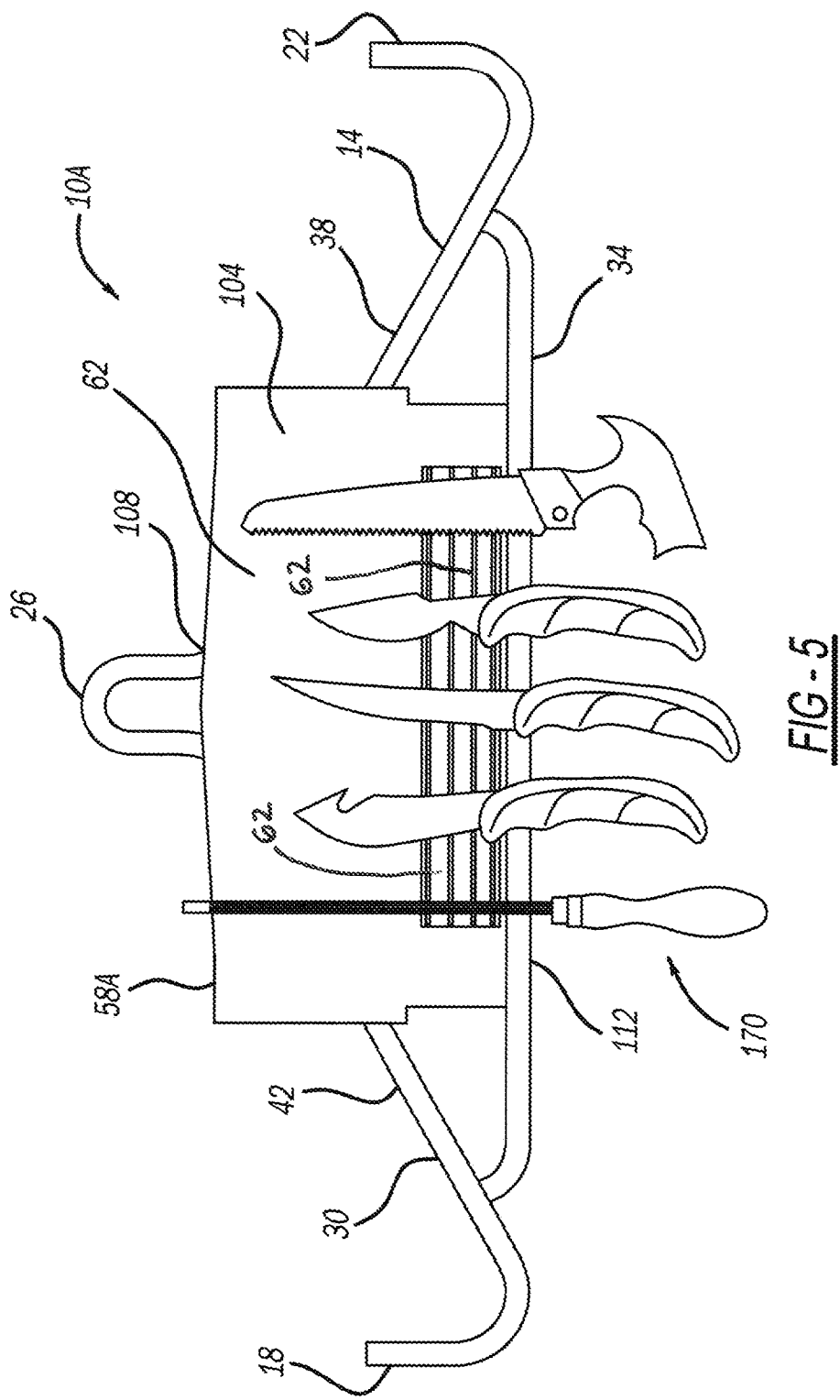
FIG. 5 is a schematic, front view of the alternative fastening system operatively connected to a gambrel.

FIG. 5, wherein like reference numbers refer to like components from FIGS. 1-4, schematically depicts the fastening system 58A operatively connected to a gambrel 14. To attach the fastening system 58A to the gambrel 14, the loop 26 is inserted through the slot 108, and the piece of flexible material 104 is folded so that the edges 112, 116 are adjacent one another, thereby positioning the magnets 62 in a position (relative to the gambrel 14) similar to that of the magnets in the embodiment of FIGS. 1-3, i.e., adjacent and parallel to the transverse segment 34. The line at which the material is folded is shown at 120 in FIG. 4. Five ferrous tools 170 are shown connected by magnetic force to the gambrel 14 via the magnets 62 of fastening system 58A.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
  a gambrel defining two hooks configured to support an animal carcass; and
  a fastening system operatively connected to the gambrel and configured to releasably connect a bladed tool to the gambrel;
  wherein the fastening system includes at least one magnet;
  wherein the fastening system includes a plate welded to the gambrel; and
  wherein said at least one magnet is connected to the plate.

2. The apparatus of claim 1, further comprising at least one tool having a ferrous blade; said tool being connected to the fastening system by magnetic attraction between the blade and said at least one magnet.

3. An apparatus comprising:
  a gambrel defining two hooks configured to support an animal carcass; and
  a fastening system operatively connected to the gambrel and configured to releasably connect a bladed tool to the gambrel;
  wherein the fastening system includes at least one magnet;
  a piece of flexible material defining a slot through which a portion of the gambrel extends; said flexible material being folded along a line that extends through or adjacent the slot; and
  wherein said at least one magnet is mounted to the flexible material.

4. The apparatus of claim 3, wherein the piece of flexible material includes a first edge and a second edge;
  wherein said at least one magnet includes a first magnet and a second magnet; and
  wherein the first magnet is mounted to the piece of flexible material at or adjacent to the first edge; and
  wherein the second magnet is mounted to the piece of flexible material at or adjacent to the second edge.

* * * * *